United States Patent [19]

Ojakaar

[11] Patent Number: 4,529,759
[45] Date of Patent: Jul. 16, 1985

[54] PEROXIDE-CURABLE BROMINATED OR IODINATED FLUOROELASTOMER COMPOSITION CONTAINING AN N,N,N',N'-TETRASUBSTITUTED 1,8-DIAMINONAPHTHALENE

[75] Inventor: Leo Ojakaar, Hockessin, Del.

[73] Assignee: E. I. Du Pont de Nemours and Company, Wilmington, Del.

[21] Appl. No.: 679,528

[22] Filed: Dec. 7, 1984

[51] Int. Cl.$^3$ .......................... C08K 5/18; C08F 8/32
[52] U.S. Cl. ........................................ 524/83; 524/89;
524/256; 524/546; 525/326.3; 525/382
[58] Field of Search .................. 524/256, 83, 546;
525/326.3, 382, 89

[56] References Cited

U.S. PATENT DOCUMENTS

| | | | |
|---|---|---|---|
| 2,115,473 | 4/1938 | Semon | 524/256 |
| 2,116,333 | 5/1938 | Williams et al. | 524/256 |
| 2,793,200 | 5/1957 | West | 525/326.3 |
| 2,951,832 | 9/1960 | Moran | 525/382 |
| 2,979,490 | 4/1961 | West | 525/326.3 |
| 4,250,278 | 2/1981 | Suzuki et al. | 525/326.3 |
| 4,467,074 | 8/1984 | Oka et al. | 525/326.3 |
| 4,487,878 | 12/1984 | Vasta | 525/326.3 |
| 4,490,501 | 12/1984 | Vasta | 525/326.3 |

Primary Examiner—Herbert J. Lilling

[57] ABSTRACT

A peroxide-curable fluoroelastomer composition which comprises a fluoroelastomer whose interpolymerized units consist essentially of units derived from vinylidene fluoride, units derived from at least one other fluorine-containing monomer copolymerizable therewith, said monomer being a compound which contains 2–7 carbon atoms, contains no bromine atoms or iodine atoms, and contains at least as many fluorine atoms as carbon atoms, and said fluoroelastomer contains up to 3 mole percent of units derived from a bromine-containing olefin or 0.1–2 mole percent of units derived from an iodine-containing olefin, and from about 0.05–2 parts per 100 parts fluoroelastomer of an N,N,N',N'-tetrasubstituted 1,8-diaminonaphthalene having the formula:

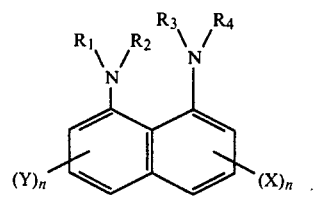

wherein $R_1$, $R_2$, $R_3$ and $R_4$ are independently alkyl groups of 1–6 carbon atoms, phenyl or benzyl, $R_1$ and $R_2$ and/or $R_3$ and $R_4$ can be joined to form a 5- or 6-membered heterocyclic ring in which a carbon atom can be replaced by an oxygen or a sulfur atom, $R_1$ and $R_3$ and/or $R_2$ and $R_4$ can be joined to form a heterocyclic ring of 6–20 carbon atoms in which a carbon atom can be replaced by an oxygen or a sulfur atom, X and Y are independently an alkyl group or an alkoxy group containing 1–4 carbon atoms and n is 0–3.

15 Claims, No Drawings

PEROXIDE-CURABLE BROMINATED OR IODINATED FLUOROELASTOMER COMPOSITION CONTAINING AN N,N,N',N'-TETRASUBSTITUTED 1,8-DIAMINONAPHTHALENE

BACKGROUND OF THE INVENTION

This invention is directed to a peroxide-curable brominated or iodinated fluoroelastomer composition that contains an N,N,N',N'-tetrasubstituted 1,8-diaminonaphthalene that functions as a mold release agent, accelerates the rate of cure of the polymer and does not detrimentally affect the physical properties of the polymer.

Peroxide-curable vinylidene fluoride based fluoroelastomers that contain units derived from brominated olefins have been favorably accepted by the industry. These fluoroelastomers when peroxide cured have good resistance to damage by heat, solvents and corrosive chemicals and they are characterized by being especially resistant to degradation by steam. However, the manufacture of molded products made from these polymers has presented a serious problem because the vulcanizates tenaciously adhere to the walls of the mold cavity, in spite of the fact that mold release agents are sprayed on the mold cavity or incorporated in the polymer, and the shaped product is frequently torn or damaged when removed from the mold. Also, the incorporation of a mold release agent into the polymer can, and usually does, have serious adverse effects on the physical and cure properties of the vulcanizate, for example, Mooney Scorch and compression set, which can limit the successful commercial use of the polymer. Deposits of polymer on the mold cavity surface and poor release of the shaped vulcanizate from the mold are major reasons for rejecting the shaped article which, of course, adds to the expense of manufacture of such molded articles. The corresponding peroxide-curable fluoroelastomer compositions that contain units derived from an iodinated olefin do not have as serious a problem of vulcanizate tearing when removed from metal mold cavities as do the fluoroelastomer compositions containing brominated olefin cure-sites. However, the rate of cure of the fluoroelastomer compositions having iodinated olefin cure sites can be accelerated using the fluoroelastomer compositions of the present invention, and rapid cure is especially important when the fluoroelastomer composition is used in injection molding operations. The present invention provides a peroxide-curable fluoroelastomer composition containing an N,N,N',N'-tetrasubstituted 1,8-diaminonaphthalene that does not stick to the metal mold cavity and tear when ejected or removed from the mold cavity while, at the same time, the incorporation of the aromatic diamine into the polymer does not detrimentally affect its important physical properties and, furthermore, the rate of cure of the fluoroelastomer is accelerated.

SUMMARY OF THE INVENTION

The present invention is directed to a peroxide-curable fluoroelastomer composition which comprises:

(a) a fluoroelastomer whose interpolymerized units consist essentially of units derived from vinylidene fluoride, units derived from at least one other fluorine-containing monomer copolymerizable therewith, said monomer being a compound which contains 2–7 carbon atom, contains no bromine atoms or iodine atoms, and contains at least as many fluorine atoms as carbon atoms, and said fluoroelastomer contains up to 3 mole percent of units derived from a bromine-containing olefin or 0.1–2 mole percent of units derived from an iodine-containing olefin, and (b) from about 0.05–2 parts per 100 parts fluoroelastomer of an N,N,N',N'-tetrasubstituted 1,8-diaminonaphthalene having the formula:

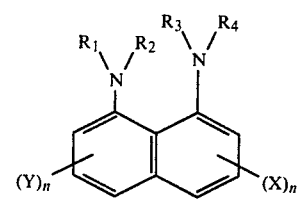

wherein $R_1$, $R_2$, $R_3$ and $R_4$ are independently alkyl groups of 1–6 carbon atoms, phenyl or benzyl, $R_1$ and $R_2$ and/or $R_3$ and $R_4$ can be joined to form a 5- or 6-membered heterocyclic ring in which a carbon atom can be replaced by an oxygen or a sulfur atom, $R_1$ and $R_3$ and/or $R_2$ and $R_4$ can be joined to form a heterocyclic ring of 6–20 carbon atoms in which a carbon atom can be replaced by an oxygen or a sulfur atom, X and Y are independently an alkyl group or an alkoxy group containing 1–4 carbon atoms and n is 0–3.

When the fluoroelastomer composition containing the N,N,N',N'-tetrasubstituted 1,8-diaminonaphthalene is peroxide-cured and shaped in a mold cavity, upon completion of the process it is readily ejected or removed from the mold cavity without tearing or damage due to adherence of the polymer to the mold cavity. Furthermore, the important physical properties of the vulcanizate are not substantially detrimentally affected and the rate of cure of the fluoroelastomer composition is increased. The resulting cured fluoroelastomer compositions of the present invention can be used to make articles such as O-rings, hose, gaskets, shaft seals and the like.

DESCRIPTION OF PREFERRED EMBODIMENTS

When the peroxide-curable fluoroelastomer having a bromine-containing olefin or an iodine-containing olefin as a cure site has incorporated therein an N,N,N',N'-tetrasubstituted 1,8-diaminonaphthalene having the formula:

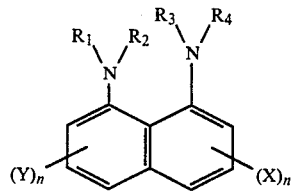

wherein $R_1$, $R_2$, $R_3$, $R_4$, X, Y and n have the values given above, the resulting fluoroelastomer composition when peroxide cured is easily removed from the mold cavity without damage, retains substantially those physical properties associated with such fluoroelastomers and the rate of cure of the elastomer is accelerated, especially for fluoroelastomers having iodine-containing olefin cure sites.

Although applicant does not wish to be limited by any theory concerning the invention, it is believed that the unusual basicity of the N,N,N',N'-tetrasubstituted 1,8-diaminonaphthalenes is due to the steric interaction of the two peri-substituted groups and this interaction is responsible for the activity of the aromatic diamines on the fluoroelastomer. The alignment and hybridization of the lone pairs of electrons on the nitrogen atoms determine to a large extent the properties of these N,N,N',N'-tetrasubstituted 1,8-diaminonaphthalenes. This explains the formation of a very strong N—H—N hydrogen bond in the monoprotonated form of the aromatic diamine. The strong basicity of these aromatic amines can be illustrated from a comparison of the basicity of 1,8-bis(dimethylamino)naphthalene, which has a pKa of 12.34, and a more typical aromatic amine, N,N-dimethylaniline, which has a pKa of 5.1.

The N,N,N'N'-tetrasubstituted 1,8-diaminonaphthalenes used in the present invention are either commercially available or can be prepared by alkylating 1,8-diaminonaphthalene with conventional alkylating agents. For example, 1,5-dimethylnaphtho[1,8-bc]-1,5-diazacycloalkanes can be synthesized by alkylation of 1,8-bis(methylamino)naphthalene with difunctional reagents such as dihalides. 1,8-bis(dimethylamino)naphthalene, which is the preferred aromatic diamine that is used in the present invention, wherein $R_1$, $R_2$, $R_3$ and $R_4$ are methyl groups, is commercially available or can be synthesized by reacting 1,8-diaminonaphthalene in tetrahydrofuran with excess dimethyl sulfate in the presence of sodium hydride. Procedures for synthesizing N,N,N',N'-tetrasubstituted 1,8-diaminonaphthalenes are further described by R. W. Alder et al., in the Journal of the Chemical Society, Perkin I, page 2840, 1981.

The N,N,N'N'-tetrasubstituted 1,8-diaminonaphthalenes used in the present invention can be divided into three categories represented generically by the following formula:

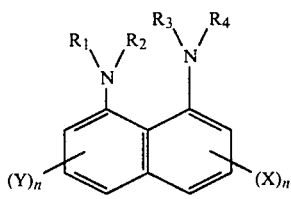

The first category includes N,N,N',N'-tetrasubstituted 1,8-diaminonaphthalenes in which $R_1$, $R_2$, $R_3$ and $R_4$ are independently alkyl groups of 1-6 carbon atoms, phenyl or benzyl. Representative compounds include 1,8-bis(diethylamino)naphthalene, 1-benzylmethylamino-8-dimethylaminonaphthalene, 1,8-bis(dimethylamino)-2,7-dimethoxynaphthalene, and 1,8-bis(diethylamino)-2,7-dimethoxynaphthalene. Preferably, $R_1$, $R_2$, $R_3$ and $R_4$ are independently alkyl groups of 1-6 carbon atoms, especially methyl groups. The second category includes compounds in which $R_1$ and $R_2$ and/or $R_3$ and $R_4$ can be joined to form a 5 or 6 membered heterocyclic ring in which one carbon atom can be replaced by one oxygen atom or one sulfur atom. Representative compounds include 1,8-bis(1-piperidinyl)naphthalene, 1,8-bis(dimorpholino)naphthalene, 1,8-bis(1-thiazolidinyl)naphthalene, 1,8-bis(1-pyrrolidinyl)naphthalene and 1-dimethylamino-8-morpholinonaphthalene. A third category includes compounds in which $R_1$ and $R_3$ and/or $R_2$ and $R_4$ can be joined to form a heterocyclic ring of 6-20 carbon atoms one of which may be replaced by an oxygen atom, or a sulfur atom. Representative compounds include 9,9-dimethylnaphtho[1,8-bc]-1,5-diazabicyclo-[3.3.1]nonane, naphtho[1,8-bc]-1,5-diazabicyclo-[3.2.2]nonane, and naphtho[1,8-bc]-1,5-diazabicyclo[3.3.3]undecane.

The amount of N,N,N',N'-tetrasubstituted 1,8-diaminonaphthalene incorporated in the fluoroelastomer composition is from about 0.05-2 parts per 100 parts fluoroelastomer and, generally, from about 0.15-1 part per 100 parts fluoroelastomer.

The N,N,N',N'-tetrasubstituted 1,8-diaminonaphthalene can be mixed with the fluoroelastomer, before or after the addition of curing additives or fillers or at the time such components are added to the composition, on a two-roll rubber mill or in a Banbury mixer or the like. Mixing can be conducted at ambient temperatures, although temperatures up to 100° C. can be used. Usually the aromatic diamine is added with the compounding ingredients at ambient temperature.

The fluoroelastomers used in the present invention contain units derived from vinylidene fluoride. In addition to units of vinylidene fluoride, the fluoroelastomer copolymers contain units derived from at least one other fluorine-containing monomer copolymerizable with vinylidene fluoride, said monomer being a compound which contains 2-7 carbon atoms, contains no bromine atoms or iodine atoms, and contains at least as many fluorine atoms as carbon atoms. Representative monomers include hexafluoropropylene, pentafluoropropylene, tetrafluoroethylene and perfluoroalkyl perfluorovinyl ether where the alkyl group contains 1-5 carbon atoms. Preferred combinations of fluoroelastomers include units from any one of the following two combinations: (1) vinylidene fluoride and hexafluoropropylene or pentafluoropropylene and tetrafluoroethylene or (2) vinylidene fluoride, tetrafluoroethylene and perfluoromethyl perfluorovinyl ether. The fluoroelastomers that are generally used in this invention are fluoroelastomers containing at least about 30% by weight vinylidene fluoride units. Usually such fluoroelastomers contain about 30-60 weight percent vinylidene fluoride units, about 20-50 weight percent hexafluoropropylene units or pentafluoropropylene or perfluoromethyl perfluorovinyl ether units and about 3-35 weight percent tetrafluoroethylene units. The fluoroelastomers used in this invention also contain as cure sites units derived from a bromine-containing olefin or an iodine-containing olefin. The term "bromine-containing olefin" or "iodine-containing olefin" as used herein means an olefin in which at least one hydrogen atom has been replaced with a bromine atom or iodine atom, respectively, and optionally, one or more of the remaining hydrogen atoms have been replaced with an atom of another halogen, preferably fluorine. Some compounds of this type are available commercially and others can be prepared by methods known in the art, for example as shown by Tarrant and Tandon, J. Org. Chem. 34 864 (1969) and by Fainberg and Miller, JACS 4170 (1957) and J. Org. Chem. 42 1985–90 (1977). Representative bromine-containing olefins which are copolymerizable with the monomers used to form the fluoroelastomer include bromotrifluoroethylene, 1-bromo-2,2-difluoroethylene, 4-bromo-3,3,4,4-tetrafluorobutene-1, vinyl bromide, 1-bromo-2,2-difluoroethylene, perfluoroallylbromide, 4-bromo-1,1,2-trifluorobutene, 4-bromo-1,1,3,3,4,4-hexafluorobutene, 4-bromo-3chloro- 1,1,3,4,4-pentafluorobutene, 6-bromo-5,5,6,6-tetrafluorohexene, 4-bromo-perfluorobutene-1 and 3,3-difluoroallylbromide. It is preferable to use sufficient units of the brominated olefin to provide at least 0.05 weight percent bromine, usually about 0.3-1.5 weight percent bromine, in the fluoroelastomer copolymer. Bromine-containing fluoroelastomers used in the process of this invention are further described in U.S. Pat. No. 4,214,060, the disclosure of which is incorporated herein by reference. Representative iodine-containing olefins which are copolymerizable with the monomers used to form the fluoroelastomer include compounds of the formula $CH_2=CH(CF_2)_xI$ where x is 2 to 6, more specifically, iodoethane, 3-chloro-4-iodo-3,4,4-trifluorobutene, 2-iodo-1,1,2,2-tetrafluoro-1-(vinyloxy)ethane, 2-iodo-1-(perfluorovinyloxy)-1,1,2,2-tetrafluoroethane, 1,1,2,3,3,3-hexafluoro-2-iodo-1-(perfluorovinyloxy)propane, 2-iodoethyl vinyl ether, 3,3,4,5,5,5-hexafluoro-4-iodopentene, iodotrifluoroethene and, preferably, 4-iodo-3,3,4,4-tetrafluorobutene-1.

The fluoroelastomers of this invention are prepared by polymerizing a bromine-containing olefin monomer or an iodine-containing olefin monomer with vinylidene fluoride and a fluorine containing olefin, e.g. preferably hexafluoropropylene or perfluoromethyl perfluorovinyl ether, optionally with tetrafluoroethylene, by emulsion processes in which the monomers are continuously added to the reactor in much the same manner as described in Apotheker et al. U.S. Pat. No. 4,035,565, especially Example 10. For further details on such emulsion polymerization processes see Moore U.S. Pat. No. 3,839,305 and Gladding et al. U.S. Pat. No. 3,707,529.

In preparing the fluoroelastomer to be used in the present invention, it is preferred that the reaction mixture of monomer components also contains a free-radical initiator, and the polymer-forming reaction is carried out as a free-radical emulsion polymerization reaction. Among the most useful free-radical initiators to use in such a reaction are ammonium persulfate, sodium persulfate, potassium persulfate, or a mixture of two or more such compounds. Also useful are other water-soluble inorganic peroxide compounds, for example, sodium, potassium, and ammonium perphosphates, perborates, and percarbonates. The initiator can be used in combination with a reducing agent such as sodium, potassium, or ammonium sulfite, bisulfite, metabisulfite, hyposulfite, thiosulfate, phosphite, or hypophosphite, or in combination with a ferrous, cuprous, or silver salt, or other easily oxidized metal compound. Known organic free-radical initiators can also be used, preferably in combination with a suitable surfactant such as ammonium perfluorooctanoate. The surfactant can be selected from those known to be useful in the manufacture of fluoroelastomers. A surfactant can, of course, also be present when using an inorganic initiator. A known chain transfer agent can also be present during the emulsion polymerization reaction. Examples of such chain transfer agents include diiodomethane, 1,1-difluoro-2,2-diiodoethylene, 1-iodoperfluorooctene and perfluorohexyl iodide.

After completion of the preferred emulsion polymerization reaction, the fluoroelastomer can be isolated from the resulting polymer latex by known methods, for example, by coagulation by adding an electrolyte or by freezing, followed by centrifuging or filtering and then drying the fluoroelastomer.

The polymer-forming reaction can also be carried out in bulk, or in an organic liquid containing an organic free-radical initiator.

During preparation of the fluoroelastomer, the reaction mixture is preferably heated in a reactor which has been flushed with an inert gas at about 50°-130° C. under superatmospheric pressure, for example, under a pressure of about 7-140 $kg/cm^2$, preferably about 35-105 $kg/cm^2$. In some of the most useful procedures, the polymerization is carried out as a continuous process and the reaction mixture has an average residence time in the reactor of about 5 to 30 minutes in some cases and up to 2 or 3 hours in others. Residence time can be calculated by dividing the reactor volume by the volume of latex produced per hour.

The fluoroelastomer in the majority of cases will have an inherent viscosity of about 0.2 dl/g or higher, with special preference for an inherent viscosity of about 0.5-2 dl/g. Inherent viscosities of the fluoroelastomers can be measured at 30° C. at a fluoroelastomer concentration of 0.3% by weight in methyl ethyl ketone.

One material which is usually blended with the fluoroelastomer during preparation, or before it is cured, is at least one metal compound selected from divalent metal oxides or divalent metal hydroxides. These metal compounds absorb certain gases and acidic materials which are evolved during vulcanization that can chemically attack and weaken the fluoroelastomer. Representative metal compounds include the oxides and hydroxides of magnesium, zinc, calcium, or lead. A metal salt of a weak acid can be used along with the oxide and/or hydroxide. Representative metal salts of weak acids include barium-, sodium-, potassium-, lead- and calcium-/-stearate, -benzoate, -carbonate, -oxalate and -phosphite. The metal compound is added to the fluoroelastomer in an amount equal to about 1-15%, preferably about 2-10%, by weight of the fluoroelastomer. Another advantage of the present invention is that less than the usual amounts of these acid acceptors, e.g., 0.5-2% by weight of the fluoroelastomer, can be used due to the strong basicity of the N,N,N',N'-tetrasubstituted 1,8-diaminonaphthalenes. Metal compounds that are useful are further described by Bowman in U.S. Pat. No. 3,686,143.

The addition of conventional coagents that are polyunsaturated compounds and cooperate with the peroxide curative to provide a useful cure can be added to the fluoroelastomer composition to increase its cure rate. The amount of coagent added to the composition is, generally, between about 0.25-10, usually 0.5-3, parts per 100 parts fluoroelastomer. Representative coagents that are especially effective include N,N'-m-phenylene dimaleimide, N,N'-diallyl acrylamide, triallyl isocyanurate, triallyl cyanurate trivinyl isocyanurate and trimethallylisocyanurate.

In preparing the present fluoroelastomer composition, exclusive of peroxide curative, one can mix the fluoroelastomer with the N,N,N',N'-tetrasubstituted 1,8-diaminonaphthalene, described hereinabove, and other ingredients, e.g. fillers, by means of any mixing apparatus known to be useful for preparing rubber or plastic compositions; for example, one can use a roller-type rubber mill or Banbury mixer equipped to operate at a temperature below the decomposition temperature of the fluoroelastomer composition.

The resulting fluoroelastomer composition containing the N,N,N',N'-tetrasubstituted 1,8-diaminonaphthalene can be cured by mixing the vinylidene fluoride-containing fluoroelastomer composition with an organic peroxide curing agent by any conventional means. Any organic peroxide can be used to cure the fluoroelastomer composition containing the aromatic diamine. Indeed, peroxides that are not especially effective in curing fluoroelastomers, such as peroxides attached to aromatic rings, can be used when the N,N,N',N'-tetrasubstituted 1,8-diaminonaphthalene is present. Preferably a dialkyl peroxide curative is used. An organic peroxide is selected which will function as a curing agent for the composition in the presence of the other ingredients which are present in the end-use fluoroelastomer composition and under the temperatures used in the curing operation without causing any harmful amount of curing during mixing or other operations which precede the curing operation. A dialkyl peroxide which decomposes at a temperature above 50° C. is especially preferred when the composition is to be subjected to processing at elevated temperatures before it is cured. In many cases one will prefer to use a di-tertiarybutyl peroxide having a tertiary carbon atom attached to a peroxy oxygen to cure the fluoroelastomer. Among the most useful peroxides of this type are 2,5-dimethyl-2,5-di-(tertiarybutylperoxy)hexyne-3 and 2,5-dimethyl-2,5-di(tertiarybutylperoxy)hexane. Other representative peroxides that can be used include dicumyl peroxide, dibenzoyl peroxide, tertiary butyl perbenzoate, ethyl-3,3-di(t-butylperoxy)butyrate, 1,1-bis(t-butylperoxy)-3,3,5-trimethylcyclohexane and the like.

The peroxide curing agent can be added to the fluoroelastomer in amounts of from about 0.5-10% based on the weight of the fluoroelastomer. One will usually prefer to employ a peroxide in an amount of about 1.5-5% based on the weight of the fluoroelastomer.

The fluoroelastomer composition can also contain one or more additives such as those known to be useful in fluoroelastomer compositions, for example, pigments, fillers and pore-forming agents.

The composition can be cured by subjecting it to conditions which result in the decomposition of the organic peroxide, for example, by heating the composition at a temperature which causes the peroxide to decompose. The initial curing of the fluoroelastomer composition in most cases is preferably carried out by heating the composition in a mold cavity for about 1-60 minutes at about 150°-200° C. Conventional rubber- and plastic-curing compression injection, or extrusion type molds are used wherein the metal mold cavity, usually made of steel, is provided with suitable heating and curing means. The fluoroelastomer composition containing a brominated cure-site and formed into a particular shape in the mold cavity does not stick to the mold cavity after it is cured and it can be cleanly removed therefrom. Prior to the present invention care had to be used in removing the cured article from the mold cavity because the shaped article would tenaciously stick to the metal walls and, frequently, the article would be damaged upon removal. Although the N,N,N',N'-tetrasubstituted 1,8-diaminonaphthalenes improve the mold release of fluoroelastomer compositions containing an iodinated cure-site, their principal benefit is increasing the rate of cure of the fluoroelastomer in the mold cavity. Increasing the cure rate is especially important when one is making parts by injection molding because of limited availability of expensive molding equipment. Equally important for both fluoroelastomer compositions containing bromine-containing olefin or iodine-containing olefin cure-site is the fact that the N,N,N',N'-tetrasubstituted 1,8-diaminonaphthalene do not adversely affect the important physical properties of the fluoroelastomer vulcanizate. Amines frequently cause a severe deterioration of the tensile strength of fluoroelastomers. However, such is not the case using the N,N,N',N'-tetrasubstituted 1,8-diaminonaphthalenes described herein with fluoroelastomers. Most often one wants a product having maximum heat resistance and dimensional stability. Therefore, after the shaped article is removed from the mold cavity, a post-curing operation is conducted wherein the article is heated in an oven or the like for about 1-48 hours at about 180°-300° C. One skilled in the art will realize that the best curing time and temperature for a particular application will depend on such factors as the nature and proportion of ingredients and the properties needed in the final product.

Fluoroelastomer compositions can easily be made in accordance with the present invention in vulcanizable grades suitable for compounding and curing by practical and economical methods to yield highly useful cured elastomer articles for applications such as gaskets, O-rings, hoses, seals and the like, which have good creep-resistance and good resistance to damage by heat, solvents and corrosive chemicals. Most importantly, the fluoroelastomer compositions of the present invention give vulcanizates that are easily removable from a metal mold cavity without tearing the shaped article and the rate of cure, especially of fluoroelastomers containing an iodine-containing olefin cure site, is accelerated.

The following examples illustrate preferred embodiments of the invention wherein amounts are given in parts by weight per 100 parts fluoroelastomer unless otherwise indicated.

EXAMPLE 1

Preparation of Fluoroelastomer Composition

Peroxide-curable fluoroelastomer compositions containing the aromatic diamine 1,8-bis(dimethylamino)-naphthalene are prepared as follows:

One hundred parts of a fluoroelastomer composed of units derived from vinylidene fluoride, hexafluoropropylene, tetrafluoroethylene and 4-bromo-3,3,4,4-tetrafluorobutene-1, (35/34/29/2 weight ratio or 50.9/21.3/26.9/0.9 mole ratio) is added to a 4×6 in. (10.2×15.2 cm) two-roll rubber mill whose rolls are heated to about 25° C. The fluoroelastomer is mixed with 30 parts of MT carbon black, 3 parts lead oxide (litharge), 3 parts triallylisocyanurate and from 0.25–1.0 parts of the aromatic diamine 1,8-bis(dimethylamino)-naphthalene, as indicated in Table I. Two or three parts Luperco ®101 XL peroxide curing agent [45% 2,5-dimethyl-2,5-di(t-butylperoxy)hexane, 55% inert filler], or 3 parts Luperco ®130 XL peroxide curing agent [45% 2,5-dimethyl-2,5-di(t-butylperoxy)hexyne-3 and 55% inert filler], or Luperco ®233 XL peroxide curing agent [40% ethyl-3,3-di(t-butylperoxy)butyrate and 60% inert filler] or Luperco ®231 XL [40% 1,1-bis(t-butylperoxy)-3,3,5-trimethylcyclohexane and 60% inert filler] are incorporated in the fluoroelastomer on the mill, as also indicated in Table I.

Physical Properties of Fluoroelastomer Compositions

To determine if there are any detrimental effects on the physical properties of fluoroelastomers due to the addition of 1,8-bis(dimethylamino)naphthalene thereto the following tests are performed.

Test samples A, B, E, F and H and the Control Sample of the fluoroelastomer compositions described in Table I are prepared as described in ASTM D-412. The samples are press-cured in an electrically-heated press for 15 minutes at 177° C. and post-cured in a circulating-air oven during a cycle of 24 hours at 232° C. They are then tested for tensile strength at break ($T_B$), modulus at 100% elongation ($M_{100}$) and elongation at break ($E_B$) under the standard ASTM D-412 conditions. Compression set values of the samples are determined using ASTM D-395 and the results are given in Table I. To determine the curing characteristics of above-described fluoroelastomer compositions, cure properties of samples of the compounded compositions are measured with an oscillating disk rheometer (ODR) according to ASTM D-2084. Table I shows the value of $t_c 90$, i.e., the time in minutes required to reach 90% of the cure state that is reached in 30 minutes.

Additional portions of the above-described fluoroelastomer compositions corresponding to test samples A, B, E, F and H and the Control Sample are aged for 70 hours at 270° C. in a circulating-air oven. Tensile strength at break ($T_B$), modulus at 100% elongation ($M_{100}$) and elongation at break ($E_B$) of these heat-aged samples are determined by ASTM D-412 and the results are given in Table I.

test has been found to provide a quantitative value which correlates inversely with the ease of demoldability of the fluoroelastomer composition from a metal mold cavity, i.e., a high test value indicates the composition is difficult to remove from the mold cavity. An Instron testing machine is used to measure the amount of force in psi required to pull a 1 in. (2.5 cm) wide stainless steel strip from the center of $1 \times 3 \times \frac{1}{4}$ in. (2.5×7.6×0.6 cm) rectangular fluoroelastomer compositions, described hereinabove, that are formed into compression-molded slabs into which the stainless steel strip is embedded to a depth of 1 in. (2.5 cm). The test sample is prepared by making a 1 in. (2.5 cm) deep slit in a $1 \times 3 \times \frac{1}{4}$ in. (2.5×7.6×0.6 cm) rectangular sample of the uncured fluoroelastomer such that the slit is parallel to the 3 in. (7.6 cm) face, runs across the entire width of the sample and is positioned equidistant between the two 3-inch faces of the sample. A $1 \times 4 \times \frac{1}{8}$ in. (2.5×10.2×0.3 cm) stainless steel strip is inserted into the slit. Spacers consisting of $1 \times 3 \times 1/16$ in. (2.5×7.6×0.16 cm) steel strips are placed above and below the stainless steel strip abutting the fluoroelastomer composition to maintain the proper configuration. The assembly is then subjected to a 15-min. press cure at 177° C. in a hydraulic press. The force required to remove the stainless steel strip from the cured polymer is determined with an Instron testing machine at 177° C. and a crosshead speed of 0.5 inches/min. (1.3 cm/min.).

TABLE I

| | Samples | | | | | | | | | |
|---|---|---|---|---|---|---|---|---|---|---|
| | Control | A | B | C | D | E | F | G | H | I |
| Ingredients | | | | | | | | | | |
| Polymer of Example 1 | 100 | 100 | 100 | 100 | 100 | 100 | 100 | 100 | 100 | 100 |
| MT Black | 30 | 30 | 30 | 30 | 30 | 30 | 30 | 30 | 30 | 30 |
| PbO | 3 | 3 | 3 | 3 | 3 | 3 | 3 | 3 | 3 | 3 |
| Triallylisocyanurate | 3 | 3 | 3 | 3 | 3 | 3 | 3 | 3 | 3 | 3 |
| Luperco ® 101 XL Curing Agent | 3 | 3 | 3 | 0 | 0 | 2 | 0 | 0 | 0 | 0 |
| Luperco ® 130 XL Curing Agent | 0 | 0 | 0 | 3 | 3 | 0 | 0 | 0 | 0 | 0 |
| Luperco ® 231 XL Curing Agent | 0 | 0 | 0 | 0 | 0 | 0 | 3 | 3 | 0 | 0 |
| Luperco ® 233 XL Curing Agent | 0 | 0 | 0 | 0 | 0 | 0 | 0 | 0 | 3 | 3 |
| 1,8-bis(dimethyl-amino)naphthalene | 0 | 0.25 | 0.5 | 0.5 | 1.0 | 1.0 | 0.5 | 1.0 | 0.5 | 1.0 |
| Stress/Strain Properties | | | | | | | | | | |
| $M_{100}$ (MPa) | 7.6 | 8.3 | 10.3 | — | — | 15.8 | 9.0 | — | 9.0 | — |
| $T_B$ (MPa) | 18.6 | 16.6 | 17.6 | — | — | 17.6 | 14.5 | — | 19.0 | — |
| $E_B$ (%) | 180 | 150 | 130 | — | — | 100 | 145 | — | 180 | — |
| Stress/Strain Properties (Heat-Aged Samples) | | | | | | | | | | |
| $M_{100}$ (MPa) | 4.1 | 4.1 | 4.8 | — | — | 8.2 | 4.8 | — | 5.2 | — |
| $T_B$ (MPa) | 13.8 | 13.1 | 11.7 | — | — | 11.0 | 10.3 | — | 10.7 | — |
| $E_B$ (%) | 260 | 260 | 190 | — | — | 120 | 265 | — | 230 | — |
| Compression Set | | | | | | | | | | |
| O-Rings 70 hrs/room temperature (%) | 25 | 22 | 17 | — | — | 15 | 30 | — | 28 | — |
| O-Rings 70 hrs/204° C. (%) | 42 | 29 | 29 | — | — | 31 | 44 | — | 46 | — |
| ODR - 177° C./12 minutes | | | | | | | | | | |
| $t_c 90$ (minutes) | 6.5 | 5.0 | 4.9 | — | — | 6.9 | 1.8 | — | 3.8 | — |

The data given in Table I show that the addition of the aromatic diamine 1,8-bis(dimethylamino)naphthalene does not detrimentally effect the important physical properties of the fluoroelastomer composition.

Improvement in Demolding

The following test measures the adhesive forces between a metal surface typical of that used in a mold cavity and the cured fluoroelastomer composition. This Since both sides of the 1 sq. inch embedded stainless steel strip contribute to the tangential demolding force $2 \times F_{tan}$, (where F is force in pounds per square inch, tan is tangent) is the quantity measured. Four determinations are made for each sample. Mean values of $2 \times F_{tan}$ and standard deviations are shown in Table II.

TABLE II

| Mold Sticking Force | Samples | | | | | | | | | |
|---|---|---|---|---|---|---|---|---|---|---|
| | Control | A | B | C | D | E | F | G | H | I |
| 2 × $F_{tan}$ (psi) Mean | 33 | 16 | 17 | 16 | 10 | 2 | 22 | 7 | 19 | 13 |
| Standard Deviation | 9 | 10 | 6 | 5 | 4 | 2 | 5 | 3 | 3 | 2 |

The results given in Table II quantitatively show that substantially less force is required to separate the fluoroelastomer rubber vulcanizate containing the aromatic diamine from the stainless steel strip than is required to remove the control sample.

EXAMPLE 2

The procedure described in Example 1 for the preparation of the fluoroelastomer composition is repeated except the fluoroelastomer is compounded with the ingredients listed in Table III in the amounts given and the fluoroelastomer is composed of units derived from vinylidene fluoride/hexafluoropropylene/tetrafluoroethylene/4-bromo-3,3,4,4-tetrafluorobutene (50/28/20/2 wt. ratio or 66/16/17/1 mole ratio).

TABLE III

| | Samples | | | | | |
|---|---|---|---|---|---|---|
| Ingredients | Control | A | B | Control | C | D |
| Polymer of Example 2 | 100 | 100 | 100 | 100 | 100 | 100 |
| MT Black | 30 | 30 | 30 | 30 | 30 | 30 |
| Litharge (PbO) | 3 | 3 | 3 | 3 | 3 | 3 |
| Triallylisocyanurate | 3 | 3 | 3 | 3 | 3 | 3 |
| Luperco ® 101 XL Curing Agent | 0 | 0 | 0 | 3 | 3 | 3 |
| Luperco ® 130 XL Curing Agent | 3 | 3 | 3 | 0 | 0 | 0 |
| 1,8-bis(dimethylamino)-naphthalene | 0 | 0.5 | 1.0 | 0 | 0.5 | 1.0 |

To determine the improvement in demolding the above-described fluoroelastomer compositions, the procedure described in Example 1 is repeated wherein an Instron testing machine is used on the rectangular molded samples of fluoroelastomer compositions in which the stainless steel strip is embedded. The results are given below in Table IV.

TABLE IV

| | Samples | | | | | |
|---|---|---|---|---|---|---|
| Molding Sticking Force | Control | A | B | Control | C | D |
| 2 × $F_{tan}$ (psi) Mean | 37 | 19 | 11 | 28 | 16 | 8 |
| Standard Deviation | 3 | 2 | 1 | 4 | 3 | 1 |

The results given in Table IV show that substantially less force is required to separate the fluoroelastomer rubber vulcanizate containing the aromatic diamine from the stainless steel strip than is required to remove the control samples.

EXAMPLE 3

The procedure described in Example 1 for the preparation of the fluoroelastomer composition is repeated except the fluoroelastomer is compounded with the ingredients listed in Table V in the amounts given and the fluoroelastomer is composed of units derived from vinylidene fluoride/hexafluoropropylene/tetrafluoroethylene/4-iodo-3,3,4,4-tetrafluorobutene-b 1/-diiodomethane (45/30/24/0.8/0.2 wt. ratio or 61.3/17.4/20.9/0.3/0.1 mole ratio).

TABLE V

| | Samples | |
|---|---|---|
| Ingredients | Control | A |
| Polymer of Example 3 | 100 | 100 |
| MT Carbon Black | 30 | 30 |
| Litharge | 3 | 3 |
| Triallylisocyanurate | 3 | 3 |
| Luperco ® 231-XL Curing Agent | 3 | 3 |
| 1,8-bis(dimethylamino)-naphthalene | 0 | 0.5 |

In order to determine the curing characteristics of the above-described fluoroelastomer compositions, cure properties of samples of the compounded fluoroelastomer composition are measured with an oscillating disk rheometer (ODR) according to ASTM D-2084. Table VI shows the value of $t_c$ 90, i.e., the time in minutes required to reach 90% of the cure state that is reached in 30 minutes.

TABLE VI

| ODR - 180° C./12 minutes | | |
|---|---|---|
| $t_c$ (90 minutes) | 6.6 | 1.1 |

The cure rate of the polymer containing the N,N,N',N'-tetrasubstituted 1,8-diaminonaphthalene was significantly increased as compared to the control sample.

EXAMPLE 4

The procedure described in Example 1 for the preparation of the fluoroelastomer composition is repeated except the fluoroelastomer is compounded with the ingredients listed in Table VII in the amounts given and the fluoroelastomer is composed of units derived from vinylidene fluoride/tetrafluoroethylene/perfluoromethyl perfluorovinyl ether/4-bromo-3,3,4,4-tetrafluorobutene-1 (55/10/34.8/1.2 wt. ratio or 74.6/8.7/16.3/0.4 mole ratio).

TABLE VII

| | Samples | | | | | |
|---|---|---|---|---|---|---|
| Ingredients | Control | A | B | Control | C | D |
| Polymer of Example 4 | 100 | 100 | 100 | 100 | 100 | 100 |
| MT Carbon Black | 30 | 30 | 30 | 30 | 30 | 30 |
| Litharge | 3 | 3 | 3 | 3 | 3 | 3 |
| Triallylisocyanurate | 3 | 3 | 3 | 3 | 3 | 3 |
| Luperco ® 101 XL Curing Agent | 3 | 3 | 3 | 0 | 0 | 0 |
| Luperco ® 130 XL Curing Agent | 0 | 0 | 0 | 3 | 3 | 3 |
| 1,8-bis(dimethylamino)-naphthalene | 0 | 0.5 | 1.0 | 0 | 0.5 | 1.0 |

To determine the improvement in demolding the above-described fluoroelastomer compositions, the procedure described in Example 1 is repeated wherein an Instron testing machine is used on the rectangular molded samples of the fluoroelastomer compositions in which the stainless steel strip is embedded. The results are given below in Table VIII.

TABLE VIII

| Mold Sticking Force | Samples | | | | | |
|---|---|---|---|---|---|---|
| | Control | A | B | Control | C | D |
| $2 \times F_{tan}$ (psi) mean | 19 | 7 | 2 | 26 | 14 | 9 |
| Standard Deviation | 6 | 4 | 1 | 8 | 5 | 4 |

The results given in Table VIII show that substantially less force is required to separate the fluoroelastomer rubber vulcanizate containing the aromatic diamine from the stainless steel strip than is required to remove the control samples.

I claim:

1. A peroxide-curable fluoroelastomer composition which comprises
   (a) a fluoroelastomer whose interpolymerized units consist essentially of units derived from vinylidene fluoride, units derived from at least one other fluorine-containing monomer copolymerizable therewith, said monomer being a compound which contains 2-7 carbon atoms, contains no bromine atoms or iodine atoms, and contains at least as many fluorine atoms as carbon atoms, and said fluoroelastomer contains up to 3 mole percent of units derived from a bromine-containing olefin or 0.1-2 mole percent of units derived from an iodine-containing olefin, and
   (b) from about 0.05-2 parts per 100 parts fluoroelastomer of an N,N,N',N'-tetrasubstituted 1,8-diaminonaphthalene having the formula:

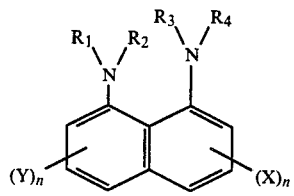

wherein $R_1$, $R_2$, $R_3$ and $R_4$ are independently alkyl groups of 1-6 carbon atoms, phenyl or benzyl, $R_1$ and $R_2$ and/or $R_3$ and $R_4$ can be joined to form a 5- or 6-membered heterocyclic ring in which a carbon atom can be replaced by an oxygen or a sulfur atom, $R_1$ and $R_3$ and/or $R_2$ and $R_4$ can be joined to form a heterocyclic ring of 6-20 carbon atoms in which a carbon atom can be replaced by an oxygen or a sulfur atom, X and Y are independently an alkyl group or an alkoxy group containing 1-4 carbon atoms and n is 0-3.

2. A peroxide-curable fluoroelastomer composition of claim 1 wherein $R_1$, $R_2$, $R_3$ and $R_4$ are independently alkyl groups of 1-6 carbon atoms.

3. A peroxide-curable fluoroelastomer composition of claim 1 wherein $R_1$, $R_2$, $R_3$ and $R_4$ are methyl groups.

4. A peroxide-curable fluoroelastomer composition of claims 1, 2 or 3 containing units derived from a bromine-containing olefin.

5. A peroxide-curable fluoroelastomer composition of claims 1, 2 or 3 containing units derived from an iodine-containing olefin.

6. A peroxide-curable fluoroelastomer composition of claim 3 wherein the fluorine-containing monomer having 2-7 carbon atoms is derived from units of hexafluoropropylene.

7. A peroxide-curable fluoroelastomer composition of claim 3 wherein the fluorine-containing monomer having 2-7 carbon atoms is derived from units of tetrafluoroethylene.

8. A peroxide-curable fluoroelastomer composition of claims 1, 2 or 3 which also contains about 1-15%, based on the weight of the fluoroelastomer, of a metal compound selected from the group consisting of divalent metal oxides and divalent metal hydroxides.

9. A peroxide-curable fluoroelastomer composition of claims 1, 2 or 3 which contains about 0.5-10% of an organic peroxide based on the weight of the fluoroelastomer.

10. A peroxide-curable fluoroelastomer composition of claims 1, 2 or 3 wherein the bromine-containing olefin is derived from units of 4-bromo-3,3,4,4-tetrafluorobutene-1.

11. A peroxide-curable fluoroelastomer composition of claims 1, 2 or 3 wherein the bromine-containing olefin is derived from units of bromotrifluoroethylene.

12. A peroxide-curable fluoroelastomer composition of claims 1, 2 or 3 wherein the bromine-containing olefin is derived from units of bromodifluoroethylene.

13. A peroxide-curable fluoroelastomer composition of claims 1, 2 or 3 wherein the iodine-containing olefin is derived from units of 4-iodo-3,3,4,4-tetrafluorobutene-1.

14. A peroxide-curable fluoroelastomer composition of claims 1, 2 or 3 which also contains about 0.25-3%, per 100 parts fluoroelastomer, of a polyunsaturated compound that is a coagent and capable of cooperating with said peroxide to provide a useful cure.

15. A peroxide-curable fluoroelastomer composition of claim 1 wherein the bromine-containing olefin is derived from units of 4-bromo-3,3,4,4-tetrafluorobutene-1 and contains from about 0.15-1 part per 100 parts fluoroelastomer of the N,N,N',N'-tetrasubstituted 1,8-diaminonaphthalene wherein $R_1$, $R_2$, $R_3$ and $R_4$ are methyl groups.

* * * * *